United States Patent [19]

Read et al.

[11] Patent Number: 4,533,791

[45] Date of Patent: Aug. 6, 1985

[54] INPUT/OUTPUT DEVICE ARRANGEMENTS FOR TERMINALS

[75] Inventors: Clifford D. Read, Almonte; William D. Sawyer, Kanata; Donald T. Chadwick, Nepean, all of Canada

[73] Assignee: Northern Telecom Limited, Montreal, Canada

[21] Appl. No.: 346,219

[22] Filed: Feb. 5, 1982

[51] Int. Cl.³ .......................................... H04M 11/00
[52] U.S. Cl. ................ 179/2 R; 179/2 DP; 312/208; 235/145 R
[58] Field of Search ............... 179/2 R, 2 DP, 100 R, 179/100 C, 100 D, 178, 179; 235/145 R, 145 A, 146; 340/365 R, 365 VL, 365 S, 710–712; 108/93, 92; 312/282, 320, 330 R, 208, 223

[56] References Cited

U.S. PATENT DOCUMENTS

| | | | |
|---|---|---|---|
| 3,778,125 | 12/1973 | Gutman, Jr. et al. | 312/208 X |
| 3,940,758 | 2/1976 | Margolin | 340/365 R X |
| 4,291,198 | 9/1981 | Anderson et al. | 179/2 DP |
| 4,316,082 | 2/1982 | Fritz | 235/146 |

Primary Examiner—Gene Z. Rubinson
Assistant Examiner—W. J. Brady
Attorney, Agent, or Firm—Stuart L. Wilkinson

[57] ABSTRACT

In a mounting arrangement of lamellar, input/output devices for a computer or telecommunications terminal, one of the devices is movable relative to another of the devices between a limited operational position in which a first input/output device is operably exposed but masks a second device, and a fully operational position in which both the first and second devices are operably exposed. One embodiment has one input/output device sliding relative to a vertically adjacent input/output device. In another embodiment, input/output devices are hinged relative to each other and to a common cabinet base. The mounting arrangements offer the advantages of spatial economy, input/output device protection, and the capacity for an aesthetically attractive cabinet.

7 Claims, 10 Drawing Figures

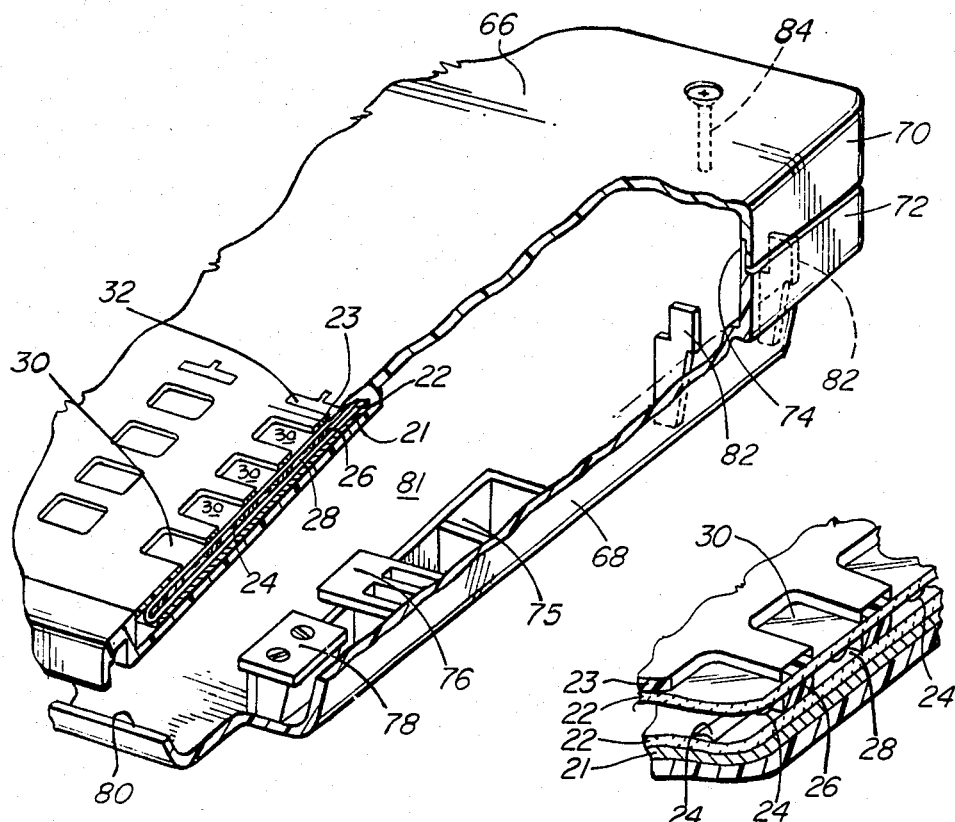
FIG. 3
FIG. 3a
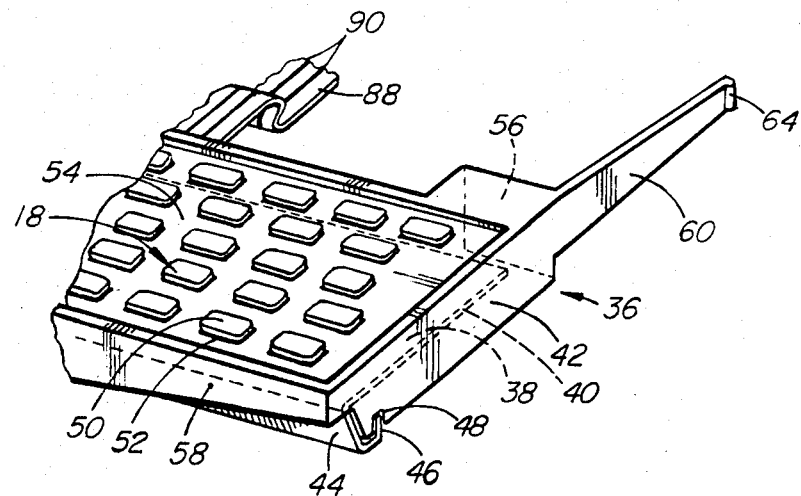
FIG. 4

INPUT/OUTPUT DEVICE ARRANGEMENTS FOR TERMINALS

This invention relates to computer or telecommunications terminal equipment and is particularly applicable to such equipment incorporating a mounting arrangement for a plurality of lamellar input/output devices.

Computer and telecommunications terminal equipment must offer a variety of input and output services, examples of which are:

| Input | Output |
| --- | --- |
| Control keypad | Display |
| Alphanumeric keypad | Loudspeaker |
| Document scanner | Printer |
| Microphone receiver | |
| Pen digitizer | |
| Magnetic cassette unit | |

Many of the devices for particularly implementing these services are lamellar in character, the reason being that a minimum area of the input/output devices is set by their being directly used by people. Thus although large scale integration techniques have reduced the size of controlling or controlled electronic circuitry, they cannot reduce the relatively large area of input/output devices since that area is set by, for example, human vision (displays), hand size (keypads), and conventional document size (optical scanners).

In combining input and output devices in a multifunctional terminal equipment, an inevitable design parameter must therefore be their lamellar character.

It is recognized that terminal equipment providing several of the services mentioned previously may, in practice, be operated predominantly to provide only one or two services. For example, in a secretarial environment, a conventional alphanumeric keypad will be used for a great deal of time in comparison to use, perhaps, of a facsimile scanner. In contrast, in another environment, the alphanumeric input facility may only occasionally be used. In such circumstances it is spatially economic and aesthetically desirable to have the little-used input/output device operably exposed only when needed.

According to the invention, there is provided a computer or telecommunications terminal equipment comprising first and second lamellar input/output devices mounted relative to one another, one of the devices being movable relative to the other device between a first position in which the first device is operably exposed but masks the second device, and a second position in which both the first and second devices are operably exposed.

In one embodiment of the invention, the second device can be embodied as a drawer slidable into a housing formed in a cabinet, said housing underlying the first device. In another embodiment, a track is formed on an upper surface of an equipment cabinet, the first device being slidable within the track to expose the second device. In a further embodiment, both of the input/output devices are hinged relative to an equipment cabinet. Examples of such input/output devices are keypads, displays, printers, microphone/loudspeaker combinations, optical scanners, and pen digitizers.

Preferably in the second position, the first and second input/output devices lie laterally adjacent one another to form a generally planar composite input/output device. The equipment base or cabinet can house electronics controlling or controlled by the input/output devices. The terminal equipment may further comprise a flexible conductor electrically connecting the movable input/output device to the controlling or controlled electronics.

Embodiments of the invention will now be described by way of example with reference to the accompanying drawings in which:

FIGS. 3 and 3a show details, in perspective, and partly in section, of a cabinet forming part of the equipment illustrated in FIGS. 1 and 2;

FIG. 4 shows a further detail, in perspective, of a drawer which is normally mounted within the FIG. 3 cabinet;

Figure 1:
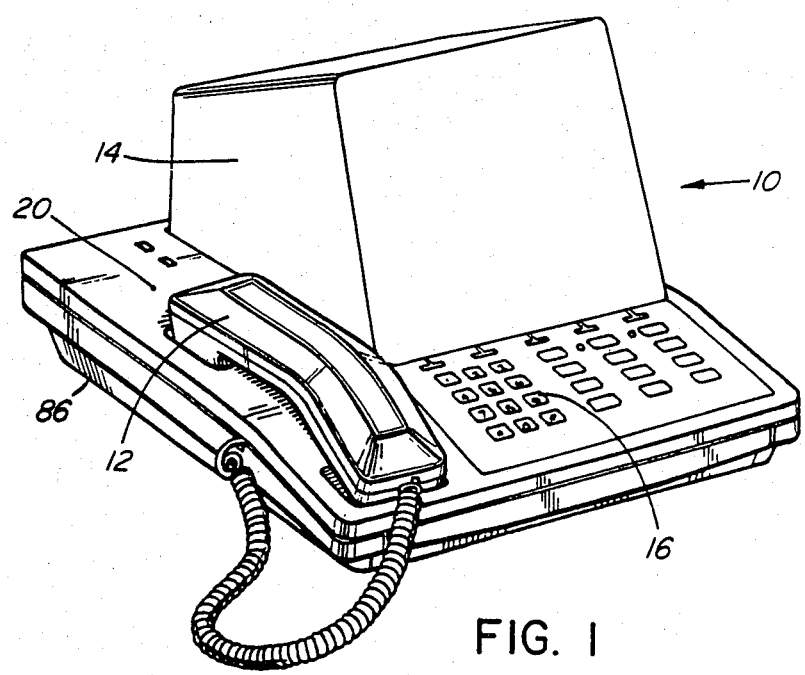
FIG. 1 shows a schematic perspective view of part of a terminal equipment having a pair of input/output devices, one of the input/output devices operably exposed, overlying and masking the other input/output device.
Figure 2:
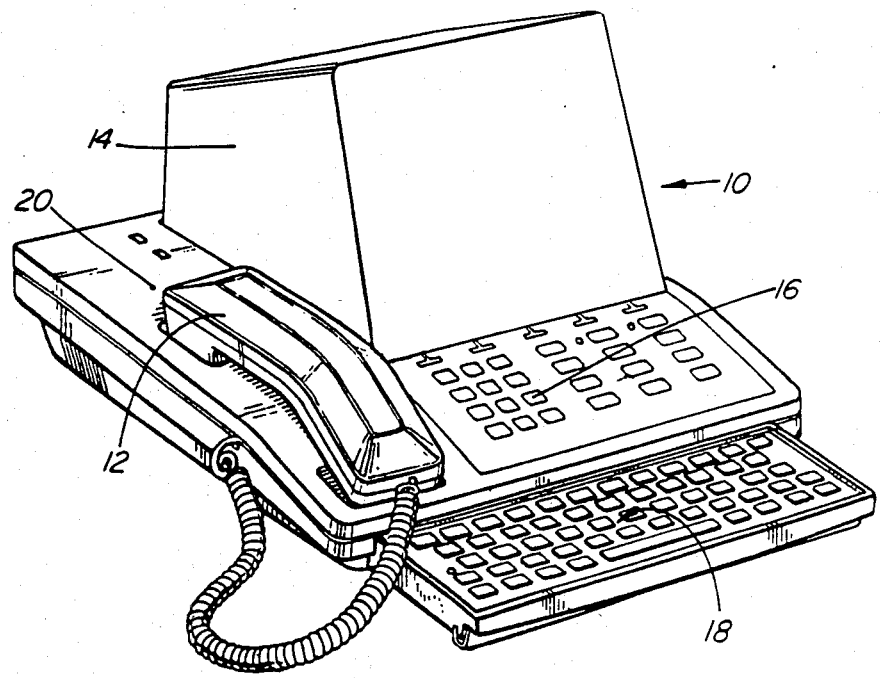
FIG. 2 shows the equipment of FIG. 1 but with both of the input/output devices operably exposed.

Referring in detail to FIGS. 1 and 2, a telecommunications terminal 10 incorporates a telephone 12, a visual display unit 14, a control keypad 16 and an alphanumeric keypad 18. The invention is particularly concerned with the manner in which the two flat input devices, the control keypad 16 and the alphanumeric keypad 18, are mounted relative to each other and to a cabinet 20. Consequently, the other functions of the terminal equipment, i.e. the telephone 12 and the visual display unit 14, will not be described in detail.

As shown in section in FIGS. 3 and 3a the control keypad consists of a backplate 21, an apertured overlay 23, and an intervening folded film having facing surfaces printed with orthogonally disposed conducting leads 24. The two films are separated by a grid 26 in which several apertures 28 are defined at designated key locations corresponding to cross-over positions of conducting leads on the respective films 22. In use, an electrical short between a particular pair of leads 24 is established by pressing the top film through an aperture 28 against the bottom film. Then the pressed key is identified by sensing a change in voltage on the particular pair of leads 24. The upper surface of the film is printed with appropriate key designations 30 and 32, the latter being located immediately in front of the visual display unit 14. The keys 32 are programmable, so permitting alteration of their control or instruction designations which are displayed in a lower part of the screen associated with the visual display unit 14 (not shown).

The alphanumeric keypad 18 is mounted on a retractable drawer 36, a detail of which is shown in FIG. 4. The keypad 18 is structurally similar to the control keypad. It is somewhat more complex in that the films (not shown) on which the conductors are printed have outwardly projecting domes at each designated key location. Also, individual keys 50 are reciprocably mounted in vertical registration with these locations. On pressing a key 50, the key travels vertically and forces the domed film part past an over-centre position. The travel and snap action provides the operator with greater tactile feedback than does the keypad 16. Keypads such as 16 and 18 are obtainable from Amp Incorporated. A baseplate 38 extends between grooves 40 formed in sidewalls 42 of the drawer frame. The baseplate 38 has a downwardly extending lip 44, an upturned edge 46 of the lip snap-locating within recesses 48 in the sidewalls 42 to fix the alphanumeric keypad 18 in position. In this position, individual keys 50 of the alphanumeric keypad 18 project through apertures 52 formed within a laterally extending web portion 54 of the drawer frame. The web portion has downwardly extending rear flanges 56 and a downwardly extending front flange 58 forming a front edge of the drawer. Sidewall extensions 60 projecting beyond the rear flanges 56 taper downwardly towards the rear and have outwardly projecting ribs 64 at their rear edges.

Referring again to FIG. 3, the cabinet within which the drawer 36 is mounted consists of a top moulding 66 and a bottom moulding 68. The mouldings have respective walls 70 and 72, the walls having edge portions 74 which are reduced in thickness and which overlap one another when the two mouldings are assembled together. The wall 72 has an upper vertical section and a lower sloping section. Integrally moulded with this lower section over part of the sides of wall 68 is an inner wall 75 which is itself integrally moulded with one retaining flange 76 and which supports a detachable retaining plate 78. The plate 78, which is screw-attached to the moulding 68, can be detached in order to mount and demount the drawer 36 relative to the bottom moulding 68. With the plate 78 fixed in position, the drawer can be slid backwards and forwards between limiting positions determined by abutment of the drawer lip 44 and the drawer rear flanges 56 with an upturned flange 80 forming the front edge of the bottom moulding 68. The drawer slides on a flat base portion 81 of the moulding 68. Integrally moulded with the base are knees 82 which, in use, support a circuit board (not shown) incorporating controlled and controlling electronics for the various functions of the terminal. Also moulded with the base 81 are internally screw-threaded columns 84 by means of which the top moulding 66 can be screw attached to the bottom moulding 68. The base also has ventilation grids 86 (FIG. 1) which enable the terminal equipment to be maintained at a reasonably cool temperature.

The top moulding 66, where it overlies the alphanumeric keypad housing, slopes downwardly towards the front of the equipment. This slope is desirable both aesthetically and ergonomically. If the drawer 36 is pulled to its fully outward position, the tapered free extensions 60 locate under the flange 76 allowing the front edge of the drawer to drop downwardly, to similarly incline the alphanumeric keypad. Consequently, the alphanumeric keypad 18 mirrors to some extent, the desirable slope of the control keypad 16. Together the keypads present an essentially composite uniplanar input keypad. In the fully inserted position of the drawer 36, the extensions 60 extend slightly further rearwardly than do the inner walls 75. As the drawer 36 is pushed in from an outer to an inner position, the extensions 60, which lie closely adjacent to the inner walls 75, prevent the drawer 36 from turning sideways and jamming. As the drawer 36 reaches its fully inserted position, the ribs 64 snap-locate beyond the furthest extension of the walls 75. In this way, the drawer is positively retained in a fully inserted position but can be extracted when pulled sufficiently forcefully by the terminal user. Since the drive and controlled electronics for the alphanumeric keypad 18 are fixed on a circuit board supported within the cabinet, a flexible lead is required between the alphanumeric keypad and the circuit board. This is provided by a Mylar (RTM) ribbon 88 printed with silver conducting leads 90. Although not shown in the illustrations, the cabinet wall has strengthened apertures at which adaptor jacks are mounted for attachment to a telephone line and the telephone handset. Other passages (not shown) extending through the cabinet wall permit access for tuning the display CRT, inspection of the circuit board, and provide anchor points for feet.

As shown in FIG. 1, the alphanumeric keypad 18, since it is used relatively occasionally, is normally maintained within the cabinet underneath the control keypad 16. This arrangement offers advantages of input device protection, aesthetic appearance, and spatial economy compared with having a permanently exposed alphanumeric keypad. As shown in FIG. 1, the contour of the drawer front edge is complimentary to the contour of the remaining front and side edges of the cabinet so that when the drawer is fully inserted, the presence of the drawer cannot be easily detected. As shown in FIG. 2, in the fully extracted position the lower keypad lies laterally adjacent to the fixed control keypad which is mounted within the top moulding 66. Although there is a small step down from the control keypad 16 to the retractable alphanumeric keypad 18, the input keypads form a composite, substantially uniplanar, keypad.

Figure 6:
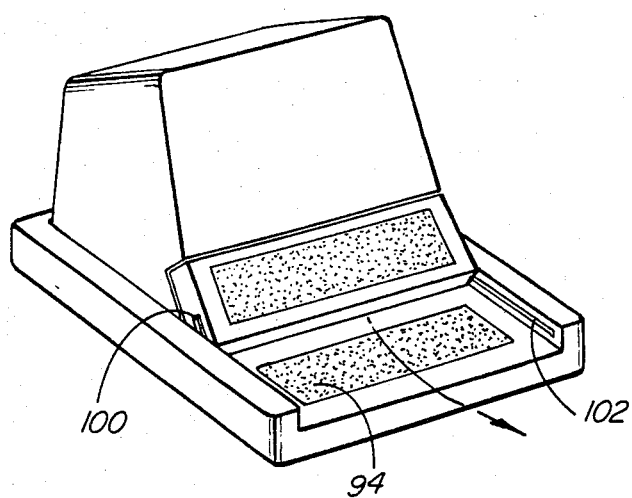
FIG. 6 shows the equipment of FIG. 5 but with both of the input/output devices operably exposed.
Figure 5:
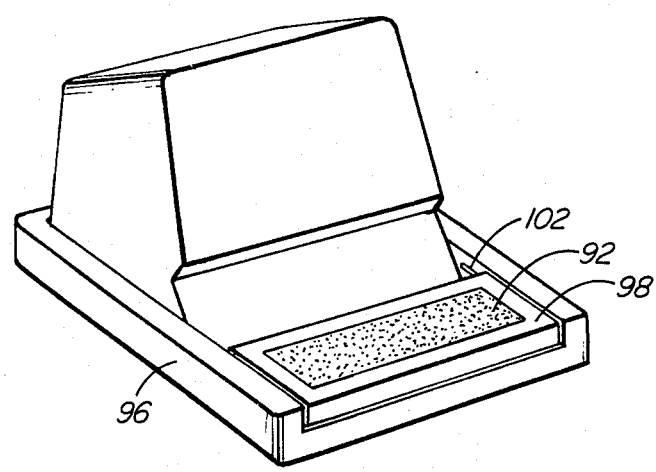
FIG. 5 shows a schematic perspective view of part of a terminal equipment having a pair of input/output devices, one of the input/output devices operably exposed, overlying and masking the other input/output device.

Referring in detail to FIGS. 5 and 6, there is shown schematically, terminal equipment similar in concept to that of FIGS. 1 and 2 but in which a control keypad 92 can slide rearwardly from the position shown in FIG. 5 in order to expose an alphanumeric keypad 94 mounted within a cabinet 96. The control keypad 92 is mounted within a moulded plastic carriage 98, the carriage having laterally projecting ribs 100 sliding within a grooved track 102 formed in the cabinet moulding. Reciprocating motion of the carriage 98 can be limited by cooperating abutment formations (not shown) moulded integrally with the cabinet and the carriage. As in the previous embodiment, a flexible conductor links the movable keypad 92 to a power source and controlled electronics (not shown) housed within the cabinet.

Figure 7:
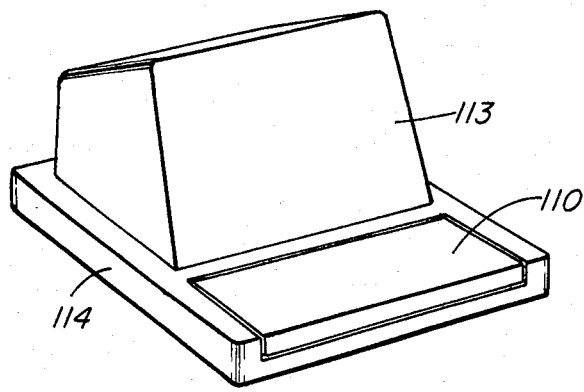
FIG. 7 shows a schematic perspective view of part of a terminal equipment having a pair of input/output devices, one of the input/output devices operably exposed, overlying and masking the other input/output device.
Figure 8:
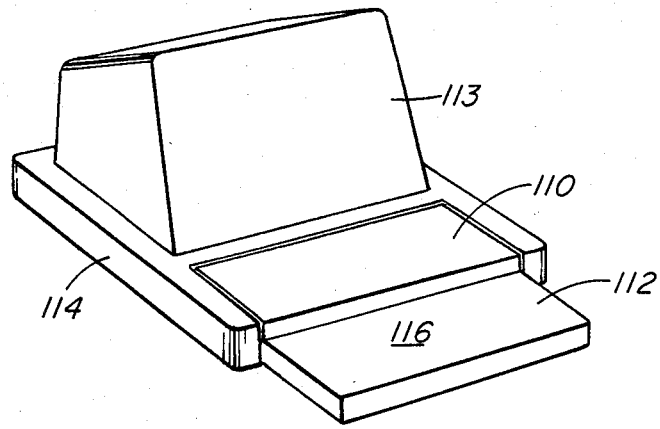
FIG. 8 shows the equipment of FIG. 7 but with both of the input/output devices operably exposed.
Figure 9:
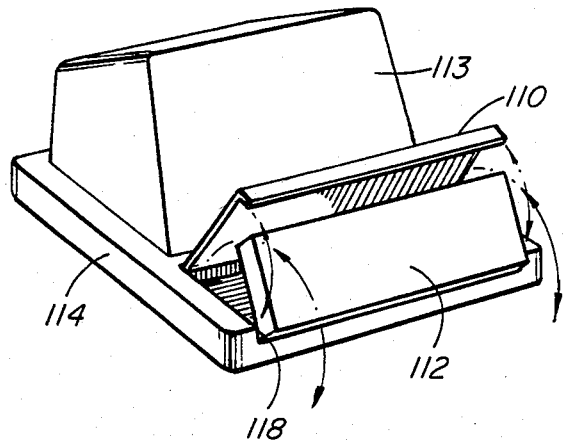
FIG. 9 shows the equipment of FIG. 7 in a position intermediate the positions shown in FIGS. 7 and 8.

Referring now to FIGS. 7, 8, and 9, an alternative form of terminal equipment has two movable input/output devices, lamellar keypads 110 and 112. The two input/output devices are hinged relative to a cabinet 114 which houses controlled and controlling electronics for a display 113 and the keypads 110 and 112. Normally, only the keypad 110 is exposed but if access to the keypad 112 is desired, the keypad 110 is hinged upwardly and rearwardly to a position permitting the keypad 112 to be hinged upwardly and forwardly to bring a surface 116 of the keypad 112 to an upwardly facing position. The display 110 is then restored to its original position. Although not illustrated in detail, both the lamellar input/output devices 110 and 112 are housed within moulded plastic frames which are pivotally mounted between inwardly facing sidewalls 118 of the cabinet 114.

A variety of lamellar input/output devices can be incorporated in terminal equipment of the type described. The exposed positions of the input/output devices depend on their functions. Thus, for example, a printing or document scanning unit must be so mounted relative to the cabinet base that paper feed in and out of the cabinet is permitted. Also, ergonomically, it may be preferable to have certain input/output devices closer to the terminal operator than other devices. Although it seems clear that a majority of terminal input/output devices must be characterized by relatively large area in view of their dependence on human vision, hand size or document size, this is certainly not true of all input/output devices that may be incorporated in future terminal equipment. A multiplicity of small area input/output devices can be arranged in a single lamellar structure to contribute to the aesthetic appearance and spatial economy of terminal equipment incorporating large area lamellar input/output devices. Thus, for example, loudspeaker and microphone components of a a handsfree telephone unit could be placed together with a magnetic cassette input unit as a single lamellar structure. Also, as mentioned earlier, some of the lamellar input/output devices can be vertically integrated to provide a dual function, for example, a pressure sensitive overlay for a display, allowing display and touch input simultaneously is made by Sierracin Corporation and marketed under the registered trademark 'Transflex'. An alternative example of a flat panel display and touch input unit is made by General Digital Corporation and marketed under the registered trademark 'VuePoint'. Liquid crystal and LED displays suitable for packaging into a lamellar unit are made by a number of companies including Philips Corporation and REC Corporation.

What is claimed is:

1. A self-contained, table top electronic telecommunications terminal comprising a bottom moulding having an upstanding sidewall and a top moulding having a depending sidewall, said sidewalls of said bottom and top mouldings mating so that said mouldings form a cabinet for electronic circuitry, the forepart of said top moulding sloping downwardly toward the front of said cabinet, a control keypad on said sloping forepart of said top moulding for controlling the functions of the terminal, a visual display on said top moulding rearward of said control keypad, a telephone handset, cord means connecting said handset to said terminal, means for supporting said telephone handset on said top moulding adjacent said control keypad and said visual display, the sidewall of said bottom moulding defining a recess at the front of said cabinet, an alphanumeric keypad slidable into and out of said recess between a concealed first position in which said alphanumeric keypad is received in said cabinet underneath said control keypad and an exposed second position in which said alphanumeric keypad is accessible for use by an operator, the front of said alphanumeric keypad having a contour complementary to the contour of the front of said cabinet and lying substantially flush with the front of said cabinet when said alphanumeric keypad is in said concealed first position, means for supporting electronic circuitry within said cabinet, and a flexible electrical connector for electrically connecting said alphanumeric keypad to electronic circuitry within said cabinet.

2. An electronic telecommunications terminal as claimed in claim 1 wherein said alphanumeric keypad in said exposed second position lies laterally adjacent said control keypad and said alphanumeric keypad and said control keypad together form a generally planar composite functional module.

3. An electronic telecommunications terminal as claimed in claim 1 wherein said electronic circuitry comprises drive and monitoring electronics under the control of said control keypad and said alphanumeric keypad.

4. An electronic telecommunications terminal as claimed in claim 1 wherein said control keypad comprises an instruction keypad having a plurality of programmable keys.

5. An electronic telecommunications terminal as claimed in claim 1 further comprising guide means on said cabinet engaging complementary means on said alphanumeric keypad for guiding movement of said alphanumeric keypad between said concealed first position and said exposed second position.

6. An electronic telecommunications terminal as claimed in claim 5 wherein said guide means and complementary means comprise cooperating mounting means ensuring that said alphanumeric keypad is inclined to a horizontal plane when in said exposed second position.

7. An electronic telecommunications terminal comprising a cabinet, a visual display on top of said cabinet, a first input keypad on said cabinet forward of said visual display, a second input keypad on a carriage, said carriage engaging a track on said cabinet and being selectively movable along said track between a first position in which said carriage overlies and conceals said first input keypad and only said second input keypad is exposed and a second position in which both said first input keypad and said second input keypad are exposed and are accessible for use by an operator.

* * * * *